United States Patent
Smith et al.

(10) Patent No.: US 8,213,336 B2
(45) Date of Patent: Jul. 3, 2012

(54) DISTRIBUTED DATA CENTER ACCESS SWITCH

(75) Inventors: Michael Smith, San Jose, CA (US); Anusankar Elangovan, San Francisco, CA (US); David Thompson, Rogers, MN (US); Mark Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 12/380,072

(22) Filed: Feb. 23, 2009

(65) Prior Publication Data

US 2010/0214949 A1    Aug. 26, 2010

(51) Int. Cl.
*H04L 12/28* (2006.01)
(52) U.S. Cl. ........................................ 370/254
(58) Field of Classification Search ........................ None
See application file for complete search history.

(56) References Cited

U.S. PATENT DOCUMENTS

| | | |
|---|---|---|
| 2003/0014524 A1 | 1/2003 | Tormasov |
| 2006/0230407 A1 | 10/2006 | Rosu et al. |
| 2007/0028244 A1 | 2/2007 | Landis et al. |
| 2008/0163207 A1* | 7/2008 | Reumann et al. ................. 718/1 |
| 2008/0201414 A1* | 8/2008 | Amir Husain et al. ....... 709/203 |
| 2008/0271016 A1* | 10/2008 | Chess et al. ....................... 718/1 |
| 2008/0275975 A1 | 11/2008 | Pandey et al. |
| 2009/0025007 A1* | 1/2009 | Hara et al. ..................... 718/105 |
| 2009/0292858 A1* | 11/2009 | Lambeth et al. .................. 711/6 |
| 2010/0046531 A1* | 2/2010 | Louati et al. .................... 370/401 |
| 2010/0131636 A1* | 5/2010 | Suri et al. ....................... 709/224 |
| 2010/0165877 A1* | 7/2010 | Shukla et al. ................. 370/254 |

FOREIGN PATENT DOCUMENTS

WO    WO 2008/093174    8/2008

* cited by examiner

*Primary Examiner* — Chirag Shah
*Assistant Examiner* — Jenkey Van
(74) *Attorney, Agent, or Firm* — Cindy Kaplan (57) ABSTRACT

In one embodiment, an apparatus includes a processor configured for operation in a control plane in a distributed virtual switch in communication with a plurality of virtual machines each having a virtual interface. The processor is operable to identify other control planes in the distributed virtual switch, assign a virtual interface identifier to one of the virtual interfaces, receive a configuration for the virtual interface, and share the configuration with the other control planes in the distributed virtual switch. The virtual interface identifier provides a unique identifier for the virtual interface across all of the control planes. The apparatus further includes memory for storing the configuration of the virtual interface. A method for operating a network device associated with a control in the distributed virtual switch is also disclosed.

20 Claims, 8 Drawing Sheets

DISTRIBUTED DATA CENTER ACCESS SWITCH

BACKGROUND OF THE INVENTION

The present disclosure relates generally to communication networks, and more particularly, to a distributed data center access switch.

Data centers often use a small percentage of available CPU, storage, and memory capacity. This results in deployment of more servers than are necessary to perform a specified amount of work. Additional servers increase costs and create a more complex and disparate environment that can be difficult to manage. Many data center managers are turning to virtualization so that resources can be shared across a network.

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual servers sharing the same physical server hardware. This also allows the virtual server to be moved from one physical server to another physical server while maintaining continuous service availability.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method for operating a network device associated with a control plane in a distributed virtual switch in communication with a plurality of virtual machines each comprising a virtual interface generally comprises identifying at the network device, other control planes in the distributed virtual switch, assigning a virtual interface identifier to one of the virtual interfaces, receiving a configuration for the virtual interface, and sharing the configuration with the other control planes in the distributed virtual switch. The virtual interface identifier provides a unique identifier for the virtual interface across all of the control planes.

In another embodiment, an apparatus generally comprises a processor configured for operation in a control plane in a distributed virtual switch in communication with a plurality of virtual machines each comprising a virtual interface. The processor is operable to identify other control planes in the distributed virtual switch, assign a virtual interface identifier to one of the virtual interfaces, receive a configuration for the virtual interface, and share the configuration with the other control planes in the distributed virtual switch. The virtual interface identifier provides a unique identifier for the virtual interface across all of the control planes. The apparatus further includes memory for storing the configuration of the virtual interface.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

Embodiments described herein operate in a networking environment, such as a data center networking environment, to form a distributed virtual switch (DVS) which allows for multiple control planes in the same distributed virtual switch. Since the scalability of a single control plane is limited to a subset of the data center, it is desired to allow the migration of virtual machines between physical servers which are connected to switches controlled by different control planes. The distributed virtual switch allows for migration of virtual machines across different control planes to create a seamless data center access layer. While the embodiments are described herein in the context of a data center networking environment, it is to be understood that the embodiments may be used in other networking environments.

In one embodiment, the virtual machine connects to a virtual Ethernet interface to which a virtual network interface card (VNIC) connects. A port profile is defined for each interface and provides a configuration template for the interface configuration. The port profile includes objects that provide a means to specify attributes such as network and security policies. The distributed virtual switch allows the virtual Ethernet interface to migrate between physical servers as the virtual machine migrates and provides a means for control planes to share port profiles so that the port profile follows the virtual machine as it migrates from one server to another.

Figure 1:
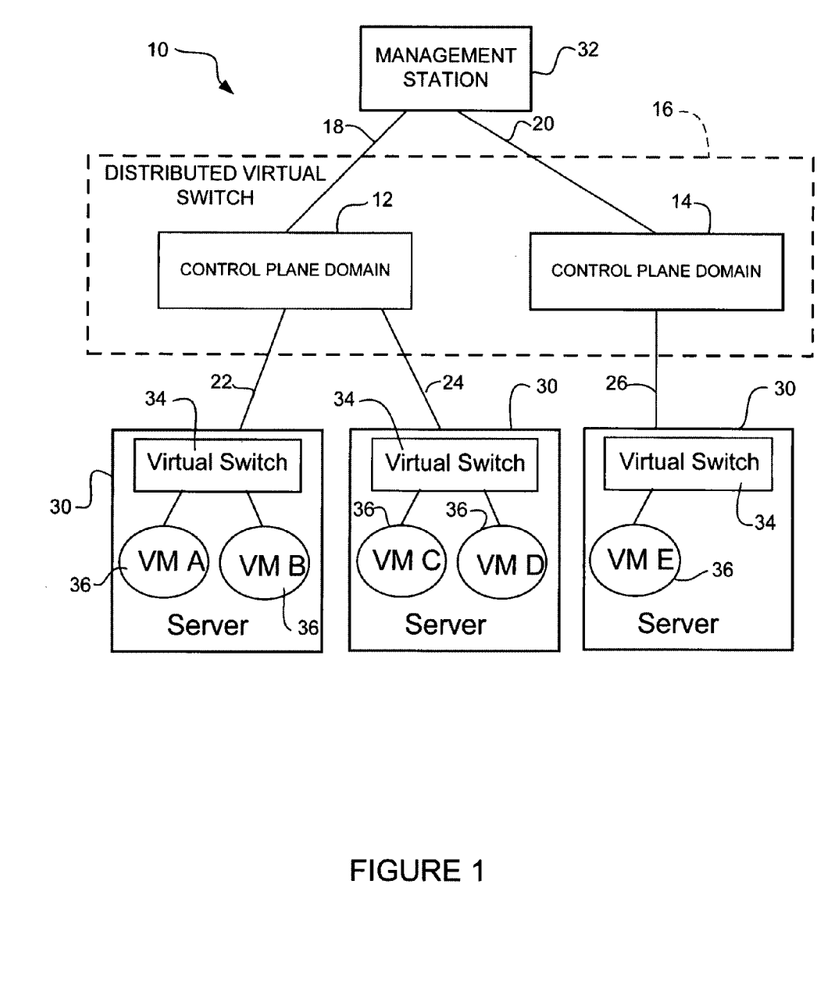
FIG. 1 illustrates an example of a network in which embodiments described herein may be implemented.

Referring now to the drawings, and first to FIG. 1, an example of a network 10 that may implement embodiments described herein is shown. For simplification, only a small number of nodes are shown. The system operates in the context of a data communication network including multiple network elements. Some of the elements in a network that employs the system may be network devices such as servers, switches, or routers. The network device may include, for example, a master central processing unit (CPU), interfaces, and a bus. The CPU preferably includes memory and a processor. The network device may be implemented on a general purpose network machine such as described below with respect to FIG. 8.

The network 10 shown in FIG. 1 includes two control plane domains 12, 14. Each of the control plane domains comprises one or more network devices (e.g., Cisco Nexus™ series switch). The control plane domain may also comprise a server, network management station, or other network device. The network devices (at the control plane domains 12, 14 shown in FIG. 1) are connected to one or more servers 30. In the example shown in FIG. 1, control plane domain 12 is connected to two servers 30 via links 22 and 24, and control plane domain 14 is connected to one server 30 via link 26. The network devices may also be in communication with a management station 32 (e.g., virtualization management platform such as VMware Virtual Center management station or others) via links 18, 20.

Each server 30 includes a virtual switch 34 and one or more virtual machines (VM A, VM B, VM C, VM D, VM E) 36. The virtual machines 36 are in communication with the virtual switch 34 via the virtual network interface card (VNIC) which connects to the virtual Ethernet interface. The virtual switches 34 are in communication with the control planes via Ethernet interfaces. The virtual switch 34 switches traffic between the virtual machines and the physical network interface card. In one embodiment, the virtual switch 34 is configured to operate in a hypervisor environment. Virtual machines 36 located within the same server (e.g., VM A and VM B in FIG. 1) may also communicate directly with one another via the virtual switch 34. As described below, each of the virtual machines 36 may be moved from one server 30 to another server. The virtual machine 36 may be moved between servers connected to the same control plane 12, 14 or different control planes.

As illustrated in FIG. 1, the control planes 12, 14 are located in a single distributed virtual switch (DVS) 16. Multiple control planes thus operate in a single DVS 16 within a virtualization management station (e.g., management station 32). The control plane is decoupled from a server administrator view of the DVS 16. This allows a server administrator to view only the single distributed data center access switch (DVS) and eliminates the need for the server administrator to understand the details of the network topology. A network administrator can view each individual control plane domain in the DVS and therefore have the ability to determine the location of a virtual machine interface (virtual Ethernet interface) at any time. As described in detail below, the virtual Ethernet interfaces, in addition to moving between servers in a single control plane, are able to migrate between different control planes within the DVS 16.

The DVS 16 is created when an initial switch (e.g., control plane 12) connects to the management station 32. When subsequent control planes (e.g., control plane domain 14) connect to the management station 32, the control planes use the same credentials to login to the management station and detect the presence of the DVS 16. The control plane 14 will thus join the existing DVS 16 rather than creating a new DVS instance.

It is to be understood that the simplified network shown in FIG. 1 is only one example, and that the embodiments described herein may be employed in networks having different configurations and types of network devices.

Figure 2:
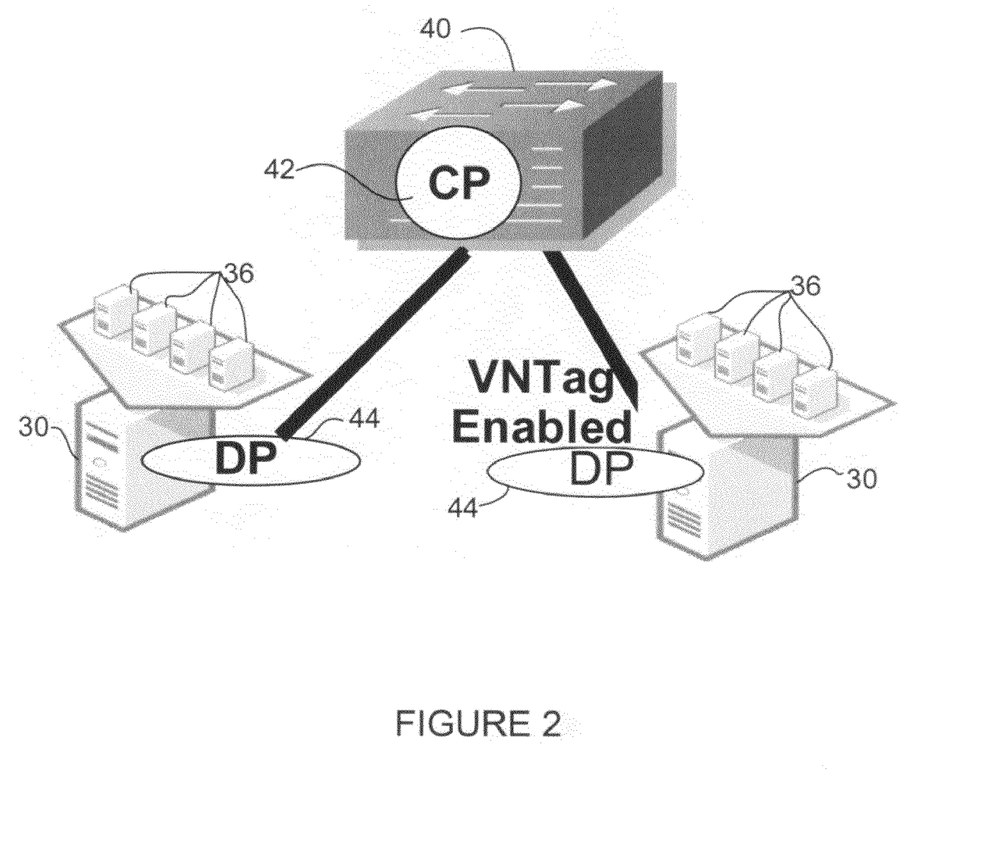
FIG. 2 illustrates details of a connection between data planes and a control plane in the network of FIG. 1.

FIG. 2 illustrates details of a connection between the servers 30 and an access switch 40 associated with a control plane 42 (e.g., control plane domains 12, 14 of FIG. 1). The control plane 42 is integrated in the switch 40. Each server 30 includes a data plane (data path) 44 associated with the control plane 42 of the switch 40. Each data path 44 is VN-Tag enabled and virtual Ethernet ports are constrained to the upstream control plane 42. Each virtual machine 36 has a virtual NIC and virtual Ethernet interface associated with one of the servers 30 and data plane 44. As previously noted, the virtual Ethernet interfaces are allowed to move between different control planes 42 as the virtual machine 36 moves from a server 30 connected to one control plane to another server connected to a different control plane.

Figure 3:
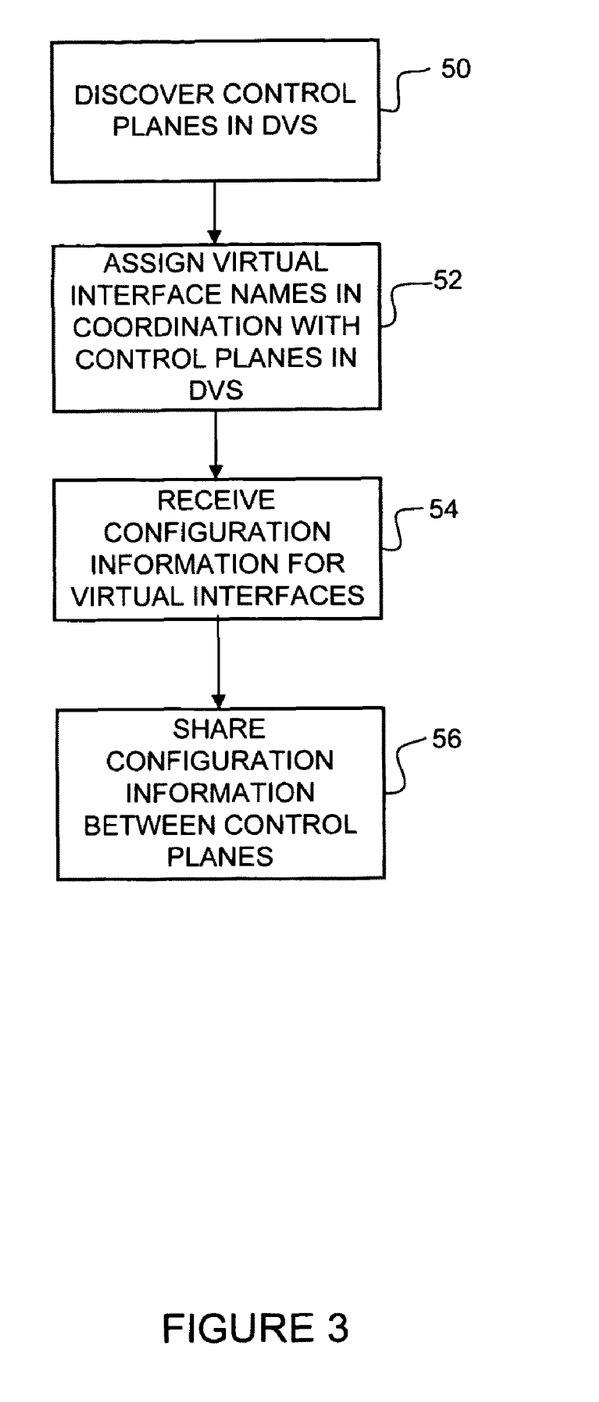
FIG. 3 is a flowchart illustrating an overview of a process for operating a network device associated with a control plane in a distributed virtual switch, in accordance with one embodiment.

FIG. 3 is a flowchart illustrating an overview of a process for operating a network device associated with a control plane in a distributed virtual switch. The network device may be, for example, a switch, server, or network management station. As discussed above, the DVS is created when an initial control plane connects to the virtualization management station. At step 50, the network device (e.g., switch in control plane domain 12 of FIG. 1), discovers other control planes that make up an existing distributed virtual switch within a virtualization management station. The other control planes may also be integrated into network devices such as switches. The switch discovers the control planes that make up the DVS and existing virtual Ethernet interface locations (i.e., virtual Ethernet to control plane bindings). This allows the network administrator to identify the DVS membership and current virtual Ethernet interface locations. At step 52 the switch assigns virtual interface identifiers to virtual Ethernet interfaces associated with the virtual machines located at a server connected to the switch. The virtual interface may be identified by a name or other identifier that provides a unique identifier for the virtual Ethernet interface across all of the control planes in the DVS. The virtual Ethernet interfaces are thus coordinated across all of the control planes. The identifier may be requested from one of the switches or management station upon original virtual Ethernet interface creation or a range of names may be provided to the switch and locally stored in memory.

The switch receives configuration information for each of its associated virtual interfaces at step 54. The switch may receive configuration information input by a user or may receive configuration information from the management station or another switch in the DVS. In one embodiment, the configuration information is a port profile that specifies attributes for the virtual interface. The port profiles may be configured by a user at the network management station and transmitted to the switch or transmitted from another network device in the DVS. The configuration information is shared between control planes in the DVS (step 56). The information may be shared periodically or requested upon a virtual machine move from one control plane to another control plane. Details of the above steps in accordance with exemplary embodiments are described below.

Communication between control planes for control plane discovery (step 50) may be performed by various processes, including for example, a peer to peer protocol, a fabric service, network management, or a client-server model. In a preferred embodiment, the client-server model is used with one of the control planes (and the associated switch) configured as the server and the other control planes (and associated switches) configured as clients. In one embodiment of the client-server architecture, one control plane is configured as the active server control plane and another control plane is configured as the backup server control plane. The backup server control plane acts as a client control plane to obtain configuration from the active server control plane. The rest of the control planes within the data center are configured as clients. The client control planes are configured with a virtual server control plane IP address, which can be obtained during discovery. The backup server control plane monitors the active server control plane and in the case of a failure at the active server, receives traffic addressed to the virtual server control plane IP address. The server control plane may use a push model to transmit data to the clients or the server control plane may advertise its IP address. The server control plane may be configured with a list of clients or discover the clients through client advertisement. In the client-server model, the server switch connects directly to the virtualization management station and passes information to the clients. The client switches and state can be viewed from the server switch.

As previously discussed, the virtual Ethernet interface name space is coordinated across control planes (step 52). The interface identifier can be requested from the server upon original virtual Ethernet interface creation. For example, upon creation of a new virtual Ethernet interface, the client control plane requests a virtual Ethernet interface name from the server control plane. This will ensure a consistent interface naming scheme across the entire data center. In one embodiment, each client control plane optimizes virtual Ethernet creation by prerequesting a range of virtual Ethernet names (e.g., 100 names).

Once the client discovers the server control plane, the client can request a download of all the known port profiles and virtual Ethernet interfaces (step 54). A periodic poll of the server control plane can be used to detect any configuration changes to the port profiles. The port profiles and virtual Ethernet interfaces are common across all control planes supporting the DVS. A user can configure port profiles at the server and pull information from clients, in the client-server model. If a port profile is present in the virtualization management station but not present in the switch, the port profile can be automatically created at the switch.

In the client-server model, the server may periodically poll the clients for configuration information or the clients may periodically submit updates to the server (step 56). The configuration information may provide dynamic state and feature configuration (e.g., SPAN (Switched Port Analyzer), IGMP (Internet Group Management Protocol) snooping, DHCP (Dynamic Host Configuration Protocol) snooping, IP Source Guard, etc.). The configuration information may also be shared between two client control planes following migration of a virtual machine, as described below with respect to the flowchart of FIG. 4.

In an alternative to the client-server model, a fabric service is used for communication between the control planes. A service such as Cisco Fabric Service (CFS) multicast IP may be used. Each control plane advertises to other control planes: (a) its control plane IP address; (b) associated management station (e.g., VMware Virtual Center server) and applicable scope of the DVS (e.g., a Data Center within the VMware Virtual Center server); and (c) virtual Ethernet interfaces. The advertisements may be transmitted periodically, or may be triggered by a new virtual Ethernet interface resident on the local control plane, new physical interface attached on local control plane, or detection of a new control plane within the same DVS.

Figure 4:
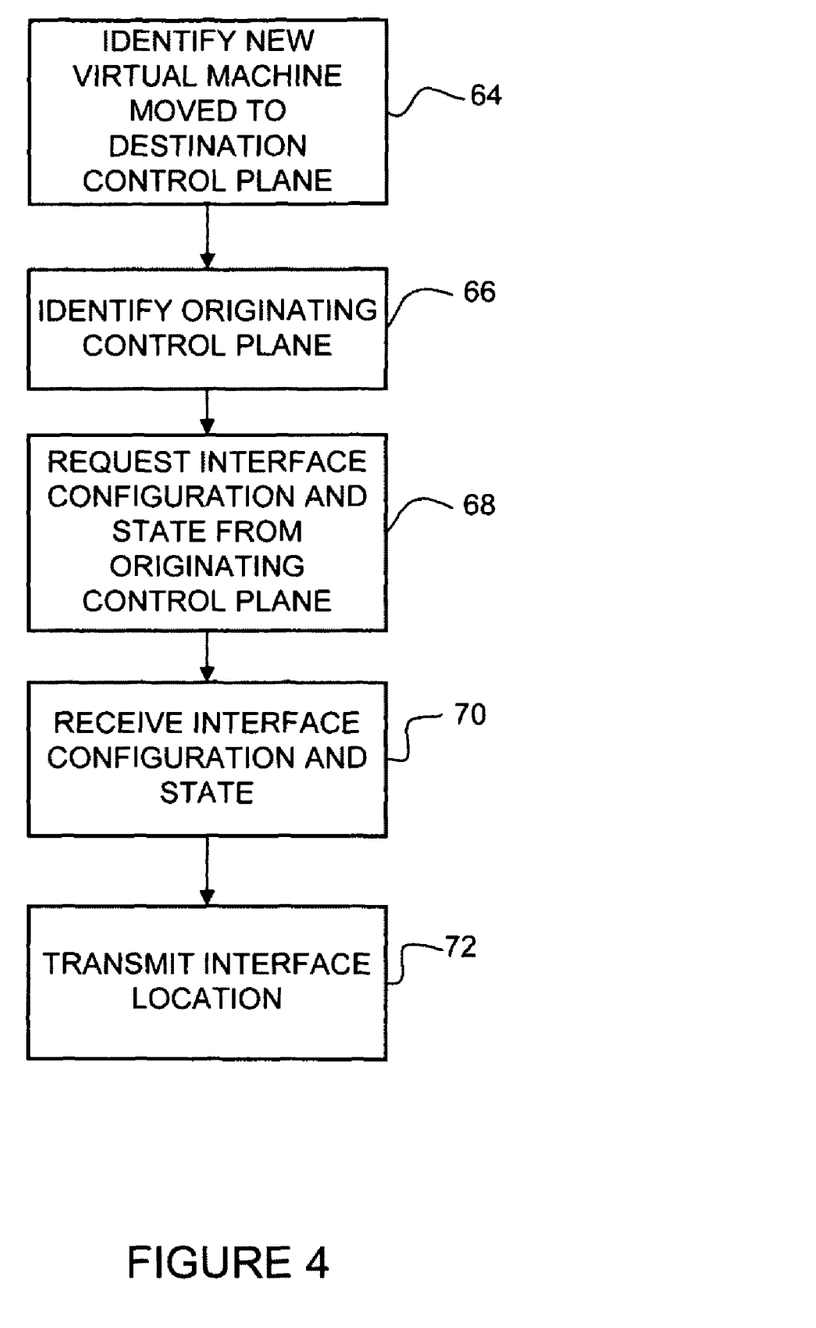
FIG. 4 is a flowchart illustrating a process for moving a virtual machine and associated interface between control planes, in accordance with one embodiment.

FIG. 4 is a flowchart illustrating a process for moving a virtual machine between control planes. The virtual machine is moved from a first server at an originating control plane to a second server at a destination control plane. At step 64 a new virtual machine is identified at the destination control plane. The destination control plane is informed via the data plane of the originating control plane IP address (step 66). Once the originating control plane is known, the destination control plane can request state and configuration information from the originating control plane (step 68). In one embodiment, the destination control plane sets up a unicast connection to the originating control plane to obtain the interface state of the virtual Ethernet interface (step 70).

In one embodiment a DVS API (application programming interface) is used to transfer state information. In the case where a DVS API is not used, the client control plane can provide the MAC address of the virtual machine VNIC attached to the virtual Ethernet interface as part of the control plane discovery process. The destination control plane would then use the MAC address to ask the server control plane for the originating control plane previously hosting the moved virtual Ethernet interface. In the client-server model, the client control plane informs the active server control plane of the new virtual Ethernet interface location (step 72). In the fabric service model, all control planes are informed of the new location of the virtual Ethernet interface.

It is to be understood that the processes illustrated in FIGS. 3 and 4 are provided as examples and that steps may be added, deleted or the order of steps may be changed, without departing from the scope of the invention.

Figure 5:
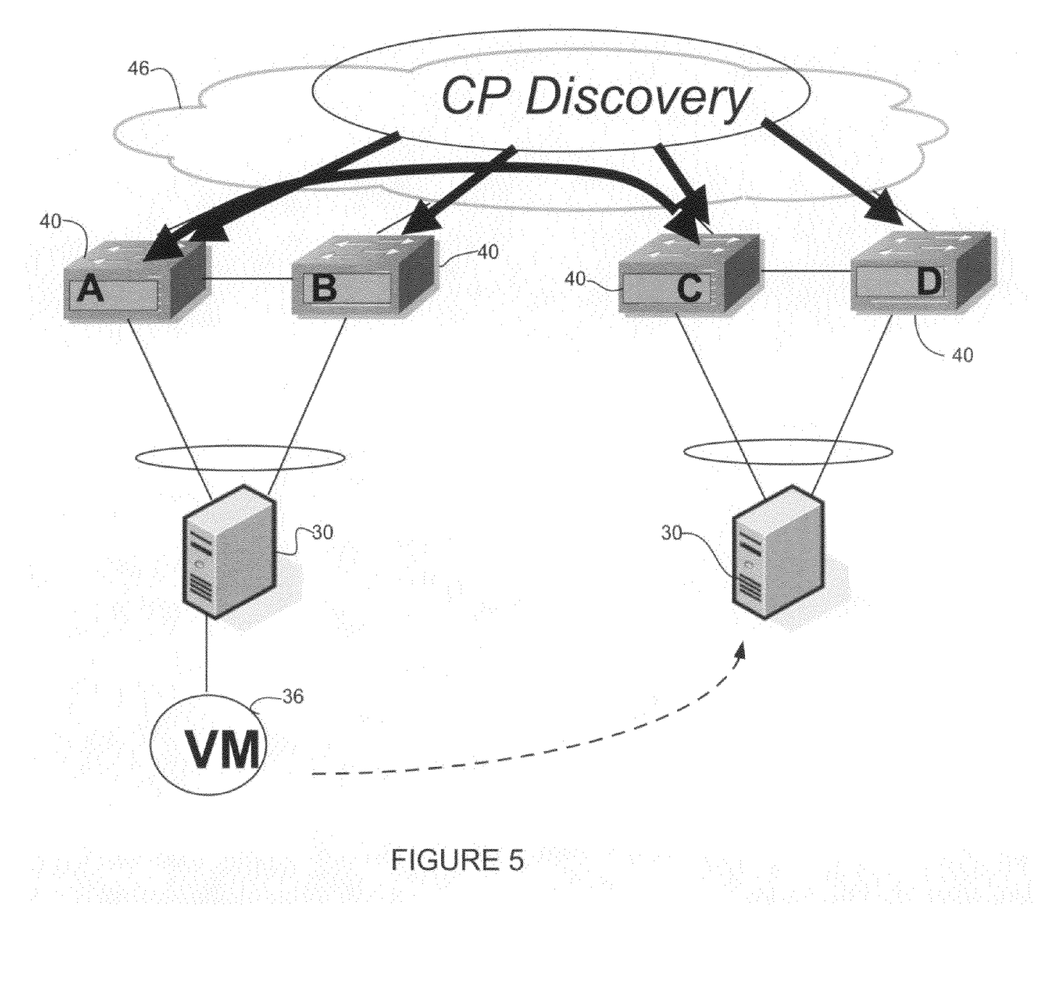
FIG. 5 depicts an example of control plane discovery and migration of a virtual machine between control planes.

FIG. 5 illustrates an example of virtual machine 36 migration between control planes. Control plane discovery is performed between switches 40 (A, B, C, and D) to identify the control planes within the DVS, as previously described. An initial list of virtual machines 36 is obtained from the virtualization management station along with the port profile names. For example, the following list may be provided by the virtualization management station to identify the connection of the virtual Ethernet interface "veth 1" to switch A:

A 1.2.3.4
    veth 1
B 1.2.3.5
C 1.2.4.5
D 1.2.4.6

Upon migration of the virtual machine to a server connected to switch C, the control plane requests its state from the originating control plane and the data plane informs the control plane of new virtual NIC, as previously described.

Figure 6:
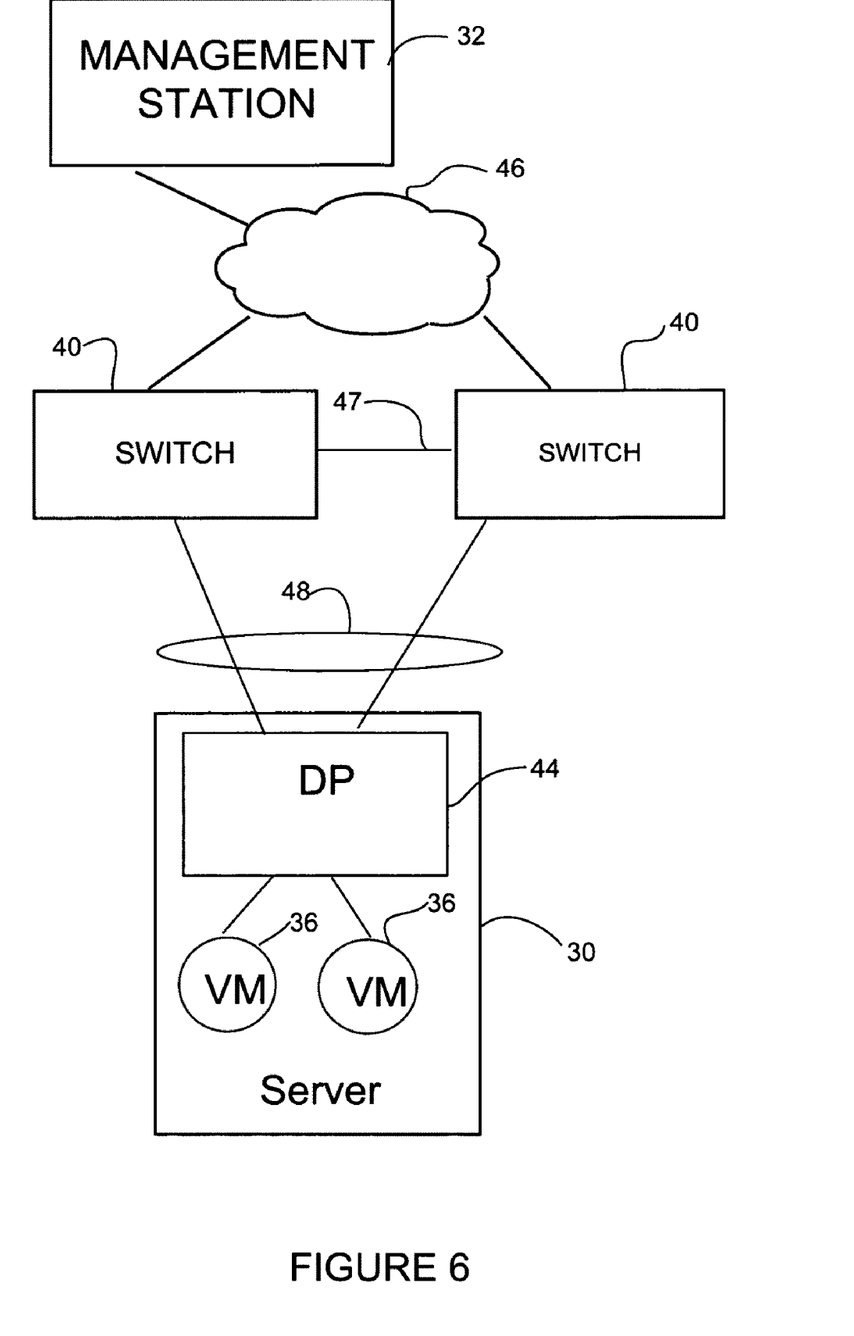
FIG. 6 is a block diagram illustrating connections between a management station and redundant control plane devices.

FIG. 6 illustrates interactions between management station 32 and switches 40. The management station 32 is in communication with two switches 40 via a network 46. In this example, the switches are connected via a multi-chassis trunk (MCT) 47 and the switches 40 are connected to the data path (server 30) via a multi-chassis Ethernet channel (MCEC) 48. The switches 40 can be configured so that one switch operates as an active switch for the data path 44, while the other switch operates as a backup (standby mode). The data path 44 can load balance by selecting the upstream switch 40 to inform about the virtual Ethernet state. The virtual Ethernet interfaces and port profiles are synchronized between the switches via the MCT 47. The switches 40 can operate to share virtualization management station credentials across the MCT 47.

Figure 7:
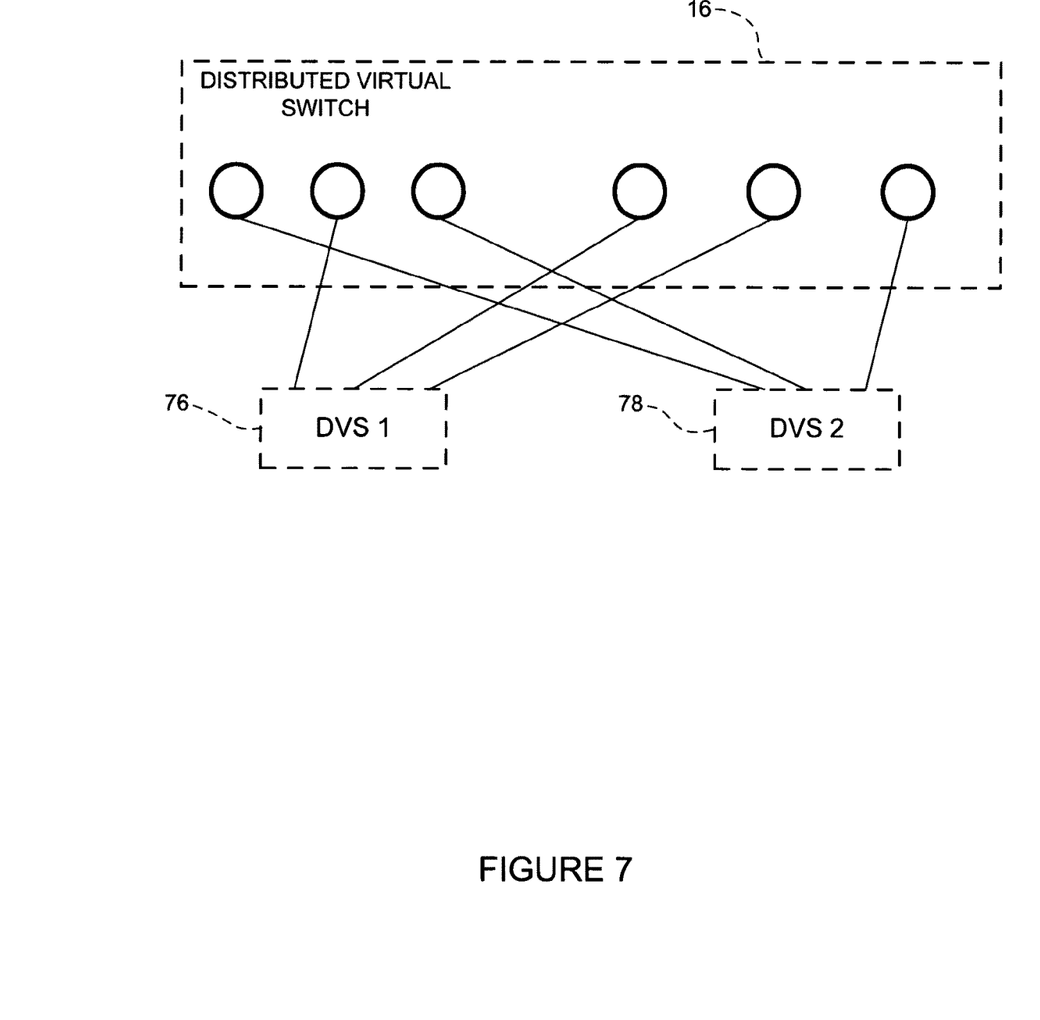
FIG. 7 is a block diagram illustrating a managed virtual switch service.

FIG. 7 illustrates an example of a managed virtual switch service. The DVS 16 is formed as described above and shown in FIG. 1. The DVS 16 is still viewed as a single DVS from a service provider perspective; however, each customer has their own DVS (e.g., DVS 1, DVS 2 indicated at 76 and 78, respectively). Role-based access control (RBAC) is provided on a virtual Ethernet interface and port profile basis and each customer has a customized view, with a separate role for each customer. In one embodiment, an external application is provided for configuration scaling. The External service application provides large scale RBAC access and a consolidated switch view to each customer. Customers can configure port profiles for their virtual machines. The application may also be used to track traffic from each virtual machine and create a layer 2 (L2) forwarding table view. The managed virtual switch service allows service providers to offer different features to different customers, track bandwidth per destination, and provide interface access control lists (ACLs,) and security groups, for example.

Figure 8:
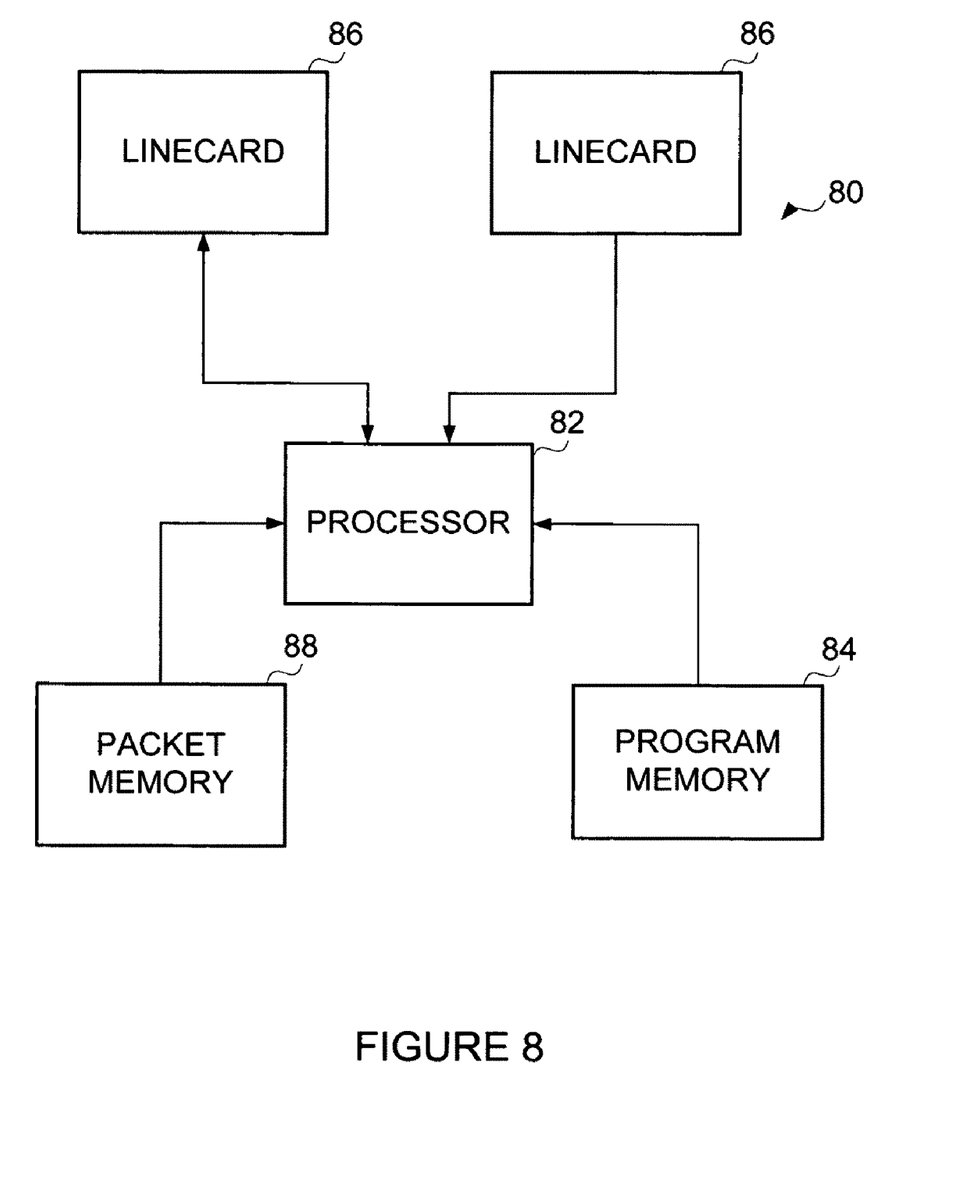
FIG. 8 depicts an example of a network device useful in implementing embodiments described herein.

FIG. 8 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 8 and described above is only one example and that different configurations of network devices may be used.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    connecting with a management station and joining a distributed virtual switch comprising a plurality of control plane domains associated with a plurality of network devices, the distributed virtual switch operating as an access switch with a control plane;
    identifying the control plane domains in the distributed virtual switch, the network devices in communication with one or more servers comprising a plurality of virtual machines each comprising a virtual interface, the one or more servers each comprising a data plane associated with the control plane of the distributed virtual switch;
    assigning a virtual interface identifier to one of said virtual interfaces, wherein said virtual interface identifier provides a unique identifier for said virtual interface across all of said control plane domains; and
    receiving a port profile for said virtual interface and sharing said port profile with said other control plane domains in the distributed virtual switch.

2. The method of claim 1 further comprising receiving notification of a location of one or more of said virtual interfaces.

3. The method of claim 1 further comprising identifying a new virtual interface and receiving state information for the new virtual interface from said control plane domain previously associated with the new virtual interface.

4. The method of claim 3 wherein receiving said state information comprises receiving an IP address of said control plane domain previously associated with the new virtual interface and requesting said state information.

5. The method of claim 3 further comprising transmitting a location of the new virtual interface.

6. The method of claim 1 wherein one of the control plane domains operates as a server control plane domain and said other control plane domains operate as client control plane domains.

7. The method of claim 6 wherein one of said other control plane domains operate as a backup server control plane domain.

8. The method of claim 6 further comprising transmitting a server control plane domain IP address to said client control plane domains.

9. The method of claim 6 further comprising configuring said port profiles for each of said plurality of virtual machines and transmitting said port profiles to said client control plane domains.

10. The method of claim 6 further comprising receiving a request for one or more of said virtual interface identifiers from one of said client control plane domains.

11. The method of claim 1 wherein the distributed virtual switch operating as an access switch is available for viewing by a server administrator.

12. The method of claim 1 wherein the distributed virtual switch comprises a plurality of customer distributed virtual switches.

13. An apparatus comprising:
    a processor for connecting with a management station and joining a distributed virtual switch comprising a plurality of control plane domains associated with a plurality of network devices, the distributed virtual switch operating as an access switch with a control plane, identifying the control plane domains in the distributed virtual switch, communicating with one or more servers comprising a plurality of virtual machines each comprising a virtual interface, assigning a virtual interface identifier to one of said virtual interfaces, receiving a port profile for said virtual interface, and sharing said port profile with said other control planes in the distributed virtual switch; and
    memory for storing said port profile of said virtual interface;
    wherein said virtual interface identifier provides a unique identifier for said virtual interface across all of said control plane domains.

14. The apparatus of claim 13 wherein the processor is configured to identify a new virtual interface and receive state information for the new virtual interface from the control plane domain previously associated with the new virtual interface.

15. The apparatus of claim 13 further comprising wherein one of the control plane domains operates as a server control plane domain and said other control plane domains operate as client control plane domains.

16. The apparatus of claim 15 wherein one of said other control plane domains operate as a backup server control plane domain.

17. The apparatus of claim 13 wherein the port profile specifies attributes for said virtual interface configured at the management station.

18. Logic encoded in one or more non-transitory tangible media for execution by a processor, and when executed operable to:
connect with a management station and join a distributed virtual switch comprising a plurality of control plane domains associated with a plurality of network devices, the distributed virtual switch operating as an access switch with a control plane;
identify the control plane domains in the distributed virtual switch, the network devices in communication with one or more servers comprising a plurality of virtual machines each comprising a virtual interface:
assign a virtual interface identifier to one of said virtual interfaces, wherein said virtual interface identifier provides a unique identifier for said virtual interface across all of said control plane domains; and
receive a port profile for said virtual interface and share said port profile with said control plane domains in the distributed virtual switch.

19. The logic of claim 18 wherein the logic is operable to identify a new virtual interface and receive state information for the new virtual interface from one of the control plane domain previously associated with the new virtual interface.

20. The logic of claim 18 wherein the logic is operable to transmit a location of one or more of said virtual interfaces in the distributed virtual switch.

* * * * *